US008289937B2

(12) United States Patent
Verma et al.

(10) Patent No.: US 8,289,937 B2
(45) Date of Patent: Oct. 16, 2012

(54) INTERNETWORKING BETWEEN WLAN AND A MOBILE COMMUNICATIONS SYSTEM

(75) Inventors: Shaily Verma, Mumbai (IN); Charles Chuanming Wang, Jamison, PA (US)

(73) Assignee: Thomson Licensing, Boulogne-Billancourt (FR)

( * ) Notice: Subject to any disclaimer, the term of this patent is extended or adjusted under 35 U.S.C. 154(b) by 1585 days.

(21) Appl. No.: 10/517,132

(22) PCT Filed: May 29, 2003

(86) PCT No.: PCT/US03/16962
§ 371 (c)(1),
(2), (4) Date: Dec. 6, 2004

(87) PCT Pub. No.: WO03/105493
PCT Pub. Date: Dec. 18, 2003

(65) Prior Publication Data
US 2006/0050667 A1 Mar. 9, 2006

Related U.S. Application Data

(60) Provisional application No. 60/386,546, filed on Jun. 6, 2002.

(51) Int. Cl.
*H04L 12/56* (2006.01)
(52) U.S. Cl. ....................... 370/338; 370/401
(58) Field of Classification Search ............... 370/328, 370/356, 401, 392, 466, 352
See application file for complete search history.

(56) References Cited

U.S. PATENT DOCUMENTS

| 6,091,953 | A | 7/2000 | Ho et al. |
|---|---|---|---|
| 6,414,950 | B1 | 7/2002 | Rai et al. |
| 6,445,922 | B1 | 9/2002 | Hiller et al. |
| 6,466,556 | B1 * | 10/2002 | Boudreaux .................. 370/331 |
| 6,505,047 | B1 * | 1/2003 | Palkisto ..................... 455/456.1 |
| 6,608,832 | B2 | 8/2003 | Forslow |
| 6,870,820 | B1 * | 3/2005 | Puuskari et al. .............. 370/328 |
| 6,957,065 | B1 * | 10/2005 | Lindholm ..................... 455/433 |
| 7,042,855 | B1 * | 5/2006 | Gilchrist et al. .............. 370/328 |
| 7,054,945 | B2 * | 5/2006 | Hurtta et al. .................. 709/230 |
| 7,058,042 | B2 * | 6/2006 | Bontempi et al. ............ 370/338 |
| 2002/0181468 | A1 * | 12/2002 | Lucidarme et al. ........ 370/395.2 |

(Continued)

FOREIGN PATENT DOCUMENTS

JP 10224407 8/1998

(Continued)

OTHER PUBLICATIONS

Search Report Dated Sep. 5, 2003.
Salberg, Bjornar, "WLAN-GPRS Integration" May 2001, pp. 1-50, http://student.grm.hia.no/master/ikt01/ikt6400/bsa1be99/report_bjornar.pdf.

(Continued)

*Primary Examiner* — Hassan Kizou
*Assistant Examiner* — Roberta A Shand
(74) *Attorney, Agent, or Firm* — Robert D. Shedd; Jeffrey M. Navon; Jerome G. Schaefer

(57) ABSTRACT

There is provided a method for supporting an internetworking between a WLAN and a mobile communications network. The mobile communications network, for example UMTS network, has a GPRS support node and a serving GPRS support node. The internetworking is facilitated by an IWF. The method comprises the steps of establishing at least one GPRS tunneling protocol tunnel between the IWF and the GGSN for transferring data signals, and establishing at least one GPRS (tunneling protocol tunnel between the GGSN and the SGSN for transferring control signals.

12 Claims, 3 Drawing Sheets

U.S. PATENT DOCUMENTS

| | | | |
|---|---|---|---|
| 2002/0191575 A1* | 12/2002 | Kalavade et al. | 370/338 |
| 2003/0002480 A1* | 1/2003 | Giustina et al. | 370/352 |
| 2003/0081607 A1* | 5/2003 | Kavanagh | 370/392 |
| 2003/0152048 A1* | 8/2003 | Soininen et al. | 370/328 |
| 2004/0001468 A1* | 1/2004 | Bichot et al. | 370/338 |
| 2004/0076179 A1* | 4/2004 | Kaminski et al. | 370/466 |
| 2004/0120474 A1* | 6/2004 | Lopponen et al. | 379/88.17 |
| 2004/0147262 A1* | 7/2004 | Lescuyer et al. | 455/434 |
| 2004/0157629 A1* | 8/2004 | Kallio et al. | 455/466 |
| 2004/0166843 A1* | 8/2004 | Hahn | 455/426.2 |
| 2005/0021586 A1* | 1/2005 | Bichot et al. | 709/200 |
| 2005/0101245 A1* | 5/2005 | Ahmavaara | 455/1 |
| 2006/0050667 A1 | 3/2006 | Verma et al. | |
| 2006/0291455 A1* | 12/2006 | Katz et al. | 370/355 |

FOREIGN PATENT DOCUMENTS

| | | |
|---|---|---|
| WO | 01/99441 A2 | 12/2001 |
| WO | 0213462 | 2/2002 |
| WO | 03105493 | 12/2003 |

OTHER PUBLICATIONS

"Broadband Radio Access Networks (BRAN); HIPERLAN Type 2; Requirements and Architectures for Interworking between HIPERLAN/2 and 3rd Generation Cellular systems; ETSI TR 101 957" ETSI Standards, LIS, Sophia Antipolis Cedex, France, vol. BR, No. V1.1.1, Aug. 1, 2001.

Digital cellular telecommunications system (Phase 2+) (GSM); Universal Mobile Telecommunications System (UMTS); General Packet Radio Service (GPRS); GPRS Tunnelling Protocol (GTP) across the Gn and Gp Interface (3GPP TS 29.060 version 5.1.0 Release 5); ETSI TS 129 060 ETSI Standards, LIS, Sophia Antipolis Cedex, France, vol. 3-CN2;3-CN4, No. V5.1.0 Mar. 1, 2002.

Supplementary European Search Report for EP03 73 1447 dated Feb. 3, 2010.

Patent Abstracts of Japan, 10244407.

* cited by examiner

INTERNETWORKING BETWEEN WLAN AND A MOBILE COMMUNICATIONS SYSTEM

This application claims the benefit, under 35 U.S.C. §365 of International Application PCT/US03/16962 filed May 29, 2003, which was published in accordance with PCT Article 21(2) on Dec. 18, 2003 in English and which claims the benefit of U.S. provisional patent application No. 60/386,546, filed Jun. 6, 2002.

BACKGROUND OF THE INVENTION

1. Field of the Invention

The present invention generally relates to interworking between networks and, more particularly, to the utilization of an InterWorking Function (IWF) as a logical Serving General Packet Radio Service (GPRS) Support Node (SGSN) for implementing a hybrid coupling arrangement between a Wireless Local Area Network (WLAN) and a mobile communications network.

2. Background of the Invention

A number of different architectures may be employed in an interworking between a Wireless Local Area Network (WLAN) coverage area and other mobile communications technologies such as Universal Mobile Telecommunications System (UMTS). As is known, WLANs offer much higher access data rates than cellular mobile networks such as UMTS, but provide very limited coverage (typically up to 100 meters from the radio transmitter), while UMTS offers widespread coverage (ranging several hundred kilometers). Interworking may be provided between a WLAN hotspot and a mobile communications network, such as UMTS, to allow a user to utilize either the WLAN or the mobile communications network, or both, depending on the location of the user. The interworking between the WLAN and the mobile communications network may provide the user with roaming capability as the user moves between, and through, the coverage areas of the WLAN and the mobile communications network in order to efficiently use the capabilities of the access networks. However, it is typically the case that the user and control planes are not separate in such an interworking and, thus, the Quality of Service (QOS) negotiations, mobility, Authentication Authorization and Accounting (MA) procedures of the UMTS are not re-used, resulting in expensive UMTS radio resources being tied up implementing these functions.

Accordingly, it would be desirable and highly advantageous to have an interworking arrangement between a WLAN and a mobile communications network (e.g., UMTS) that aids in separating the user and control planes such that the signaling still goes through the mobile communications network but the data goes through the WLAN radio resources. Such an interworking would provide the advantage that the QOS negotiations, mobility, AAA procedures of the other mobile communications network are re-used while freeing up expensive radio resources of the mobile communications network and utilizing the high data throughput of a WLAN.

SUMMARY OF THE INVENTION

The problems stated above, as well as other related problems of the prior art, are solved by the present invention, which is directed to the utilization of an InterWorking Function (IWF) as a logical Serving General Packet Radio Service (GPRS) Support Node (SGSN) for a hybrid coupling between a Wireless Local Area Network (WLAN) and a mobile communications network. Advantageously, the present invention allows for the reuse of all the signaling protocols specified in a mobile communications network (such as, e.g., a Universal Mobile Telecommunications System (UMTS). Moreover, the present invention advantageously allows for diversion of data traffic from the mobile communications network to the WLAN.

According to an aspect of the present invention, there is provided a method for supporting an interworking between a Wireless Local Area Network (WLAN) and a mobile communications network. The mobile communications network has a Gateway General Packet Radio Service (GPRS) Support Node (GGSN) and a Serving GPRS Support Node (SGSN). The interworking is facilitated by an InterWorking Function (IWF). The method comprises the steps of establishing at least one GPRS Tunneling Protocol—User plane (GTP-U) tunnel between the IWF and the GGSN for transferring data signals, and establishing at least one GPRS Tunneling Protocol—Control plane (GTP-C) tunnel between the GGSN and the SGSN for transferring control signals.

According to another aspect of the present invention, there is provided an apparatus for supporting an interworking between a Wireless Local Area Network (WLAN) and a mobile communications network. The mobile communications network has a Gateway General Packet Radio Service (GPRS) Support Node (GGSN) and a Serving GPRS Support Node (SGSN). The interworking is facilitated by an InterWorking Function (IWF). The apparatus comprises means for establishing at least one GPRS Tunneling Protocol—User plane (GTP-U) tunnel between the IWF and the GGSN for transferring data signals, and means for establishing at least one GPRS Tunneling Protocol—Control plane (GTP-C) tunnel between the GGSN and the SGSN for transferring control signals.

These and other aspects, features and advantages of the present invention will become apparent from the following detailed description of preferred embodiments, which is to be read in connection with the accompanying drawings.

DETAILED DESCRIPTION OF THE INVENTION

Figure 1:
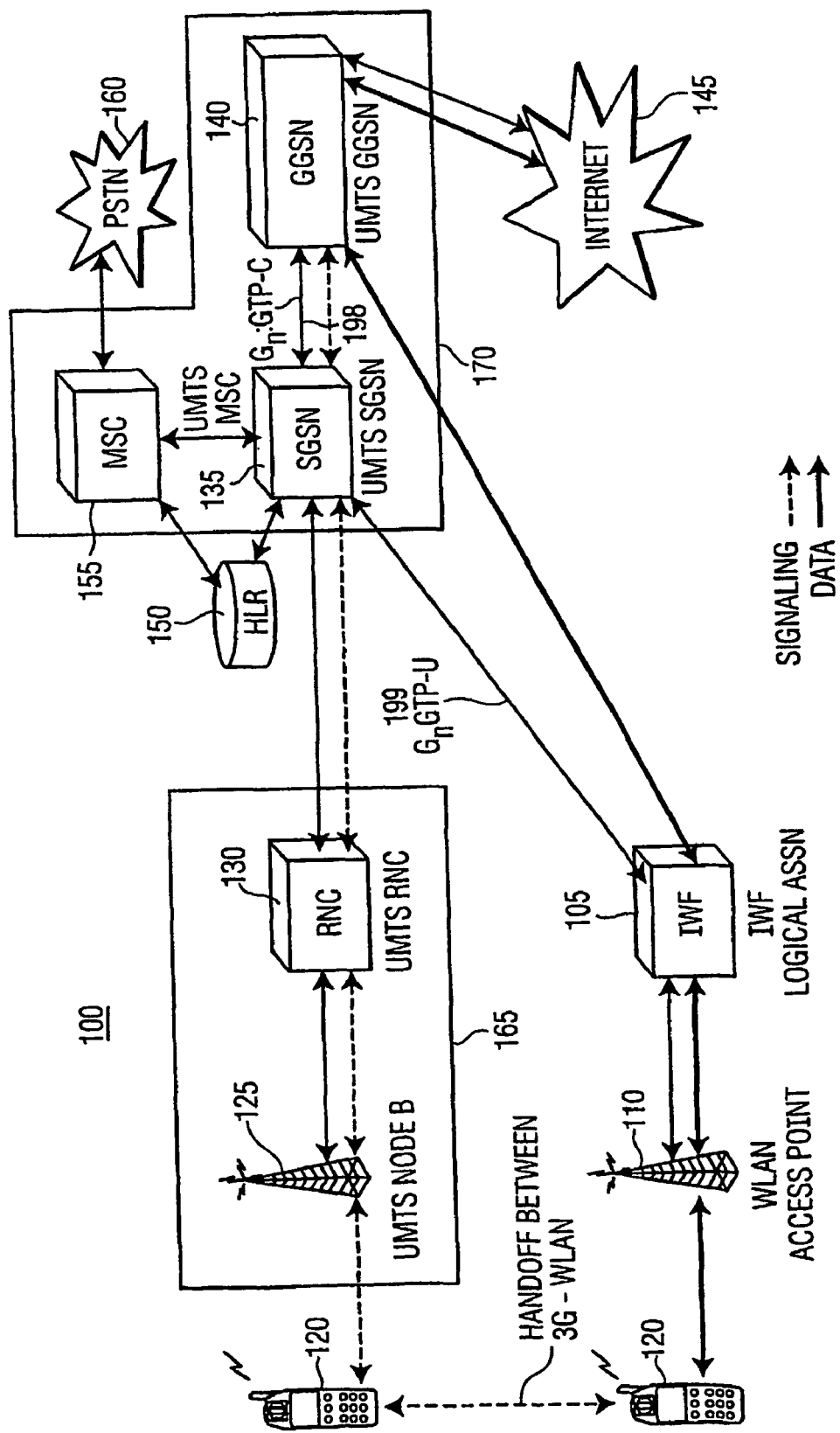
FIG. 1 is a block diagram illustrating a communication structure 100 to which the present invention may be applied, according to an illustrative embodiment of the present invention.

The present invention is directed to the utilization of an InterWorking Function (IWF) as a logical support node in a mobile communications network, in particular a Serving General Packet Radio Service (GPRS) Support Node, (SGSN) for a hybrid coupling between a Wireless Local Area Network (WLAN) and the mobile communications network. In a preferred embodiment of the present invention, the coupling is between a WLAN and a third generation (3G) Universal Mobile Telecommunications System (UMTS). However, it is to be appreciated that the present invention is not limited to UMTS (with respect to the other mobile communications network that is coupled to the WLAN) and, thus, any other type of mobile communications network may also be employed in a coupling with the WLAN while maintaining the spirit and scope of the present invention. Some of the many types of other mobile communications network include, but are not limited to, those employing, e.g., Code Division Multiple Access (CDMA) 2000, General Packet Radio Service (GPRS), and so forth.

The present invention essentially utilizes the user plane interface to connect the WLAN to the UMTS by using the Gn (user plane) interface between the WLAN gateway (IWF) and the UMTS Gateway General Packet Radio Service (GPRS) Support Node (GGSN); moreover, the present invention essentially utilizes the UMTS to carry the control plane by using the Gn (control plane) interface between the UMTS SGSN and the UMTS GGSN. Thus, the present invention aids in separating the user and control planes such that signaling still goes through the UMTS network but the data uses the WLAN. Accordingly, one of the many advantages of the present invention is that the procedures of the UMTS may be re-used for the most part while freeing up expensive UMTS radio resources.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) that is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

FIG. 1 is a block diagram illustrating a communication structure 100 to which the present invention may be applied, according to an illustrative embodiment of the present invention. A description will now be given with respect to FIG. 1 of a UMTS-WLAN interworking that employs an InterWorking Function (IWF) as a logical Serving General Packet Radio Service (GPRS) Support Node (SGSN) for the UMTS, according to an illustrative embodiment of the present invention. The WLAN may be, but is not limited to, a WLAN according to the Institute of Electrical and Electronics Engineers (IEEE) specification 802.11 or to the European Telecommunications Standards Institute (ETSI) High Performance Radio Local Area Network Type 2 (HIPERLAN2).

The communication structure includes an InterWorking Function (IWF) as a logical Serving General Packet Radio Service (GPRS) Support Node (SGSN) (and hence reference numeral 105 shall be interchangeably used herein to represent the IWF and the logical SGSN, as they are one and the same for the purposes of the present invention), a WLAN Access Point (AP) 110, a User Equipment (UE) 120, a UMTS Node B 125, a UMTS Radio Network Controller (RNC) 130, a Serving General Packet Radio Service (GPRS) Support Node (SGSN) 135, a Gateway General Packet Radio Service (GPRS) Support Node (GGSN) 140, the Internet 145, a Home Location Register (HLR) 150, a Mobile Switching Center (MSC) 155, and a Public Switched Telephone Network (PSTN) 160.

UMTS Node B 125 includes a transceiver for communicating with UE 120 via the air interface. UMTS Node B 125 performs various front end functions for providing communications between UE 120 and UMTS RNC 130. UMTS RNC 130 performs the management of the radio interface and interfaces with SGSN 135. SGSN 135 provides the interface between UTRAN 165 and the packet switched network, and performs a role similar to that of MSC 155 in the circuit switched portion. SGSN 135 performs mobility management and session management support. Communications structure 100 may comprise a plurality of UTRAN 165 coupled to SGNS 135. GGSN 140 interconnects the public land mobile network (PLMN) to any other packet data network (PDN), for example, the Internet. GGSN 140 may be viewed as an IP router that performs such functions as address mapping and tunneling. There is generally one GGSN 140 for the PLMN. MSC 155 routes calls in the circuit switched network and is connected to PTSN 160. HLR 150 is a database that administers the subscriber related data. It contains information such as, the services to which the subscriber is entitled, and the location of the area in which the subscriber is currently registered. The information of a subscriber can be retrieved using either the subscriber's unique international mobile subscriber identity number (IMSI) or Mobile Station International ISDN number (MSISDN).

The UE 120 communicates with a UMTS Terrestrial Radio Access Network (UTRAN) 165, the latter including the Node B 125 and the RNC 130. The UTRAN 165, in turn, is connected to a Core Network (CN) 170 that includes the SGSN 135 (packet based services), the MSC 155 (circuit based services) and the GGSN 140 (gateway to other Public Land Mobile Networks (PLMNs)). An Iu interface connects the UTRAN 165 to the CN 170.

The coupling employed herein is referred to as "hybrid coupling", since the tight and loose coupling definitions of the European Telecommunications Standards Institute (ETSI) do not describe the coupling employed by the present invention where the signaling and user planes are split between the UMTS and the WLAN. The splitting of the signaling and user planes aids in keeping the WLAN gateway (i.e., IWF) simple, as the WLAN gateway only needs to carry the user plane while the complex control plane reuses the UMTS. For Packet Switched (PS) services, the data plane takes the majority of radio resources. By diverting the data part to the WLAN in hotspots, considerable radio resources are conserved and can now be used for other users and other services, while the UE retains the connection with the CN 170.

A number of Access Points (APs) (e.g., WLAN AP 110) are tied back to the InterWorking Function (IWF) 105 that, in turn, is connected to the UMTS. The interworking function 105 may be embodied within a separate hardware coupled to the access points, or as a portion of the access point, and include various software modules and hardware necessary to implement the desired functions. As shown in FIG. 1, the WLAN IWF 105 bypasses the RNC 130 and the SGSN 135 and connects to the GGSN 140 (assuming PS services). The GGSN 140 takes care of the mobility at the Internet Protocol (IP) layer (see FIG. 2), but the InterWorking Function 105 will need to communicate with the GGSN 140 to establish the GPRS Tunneling Protocol-User plane (GTP-U) tunnel 199 to transfer data. A GTP tunnel in the GTP-U plane is defined for each Packet Data Protocol (PDP) context in the GSNs (i.e., SGSN 135, GGSN 140) and/or each Radio Access Bearer (RAB) in the RNC 130. A GTP tunnel in the GPRS Tunneling Protocol-Control plane (GTP-C) is defined for all PDP contexts with the same PDP address and Access Point Name (APN) for tunnel management messages. A GTP tunnel is identified in each node with a Tunnel Endpoint Identifier (TEID), an IP address and a User Datagram Protocol (UDP) port number. It is to be appreciated that the present invention is not limited to defining a GTP tunnel in the GTP-U plane for each PDP context and/RAB and, thus, other configurations may be readily employed as readily determined by one of ordinary skill in the related art, while maintaining the spirit and scope of the present invention. Moreover, it is to be appreciated that the present invention is not limited to defining a GTP tunnel in the GTP-C plane for each PDP context with the same PDP address and APN and, thus, other configurations may be readily employed as readily determined by one of ordinary skill in the related art, while maintaining the spirit and scope of the present invention. Further, it is to be appreciated that the present invention is not limited to identifying GTP tunnels with all of a TEID, an IP address and a UDP port number and, thus, other indicia may be readily employed as readily determined by one of ordinary skill in the related art, while maintaining the spirit and scope of the present invention.

Figure 2:
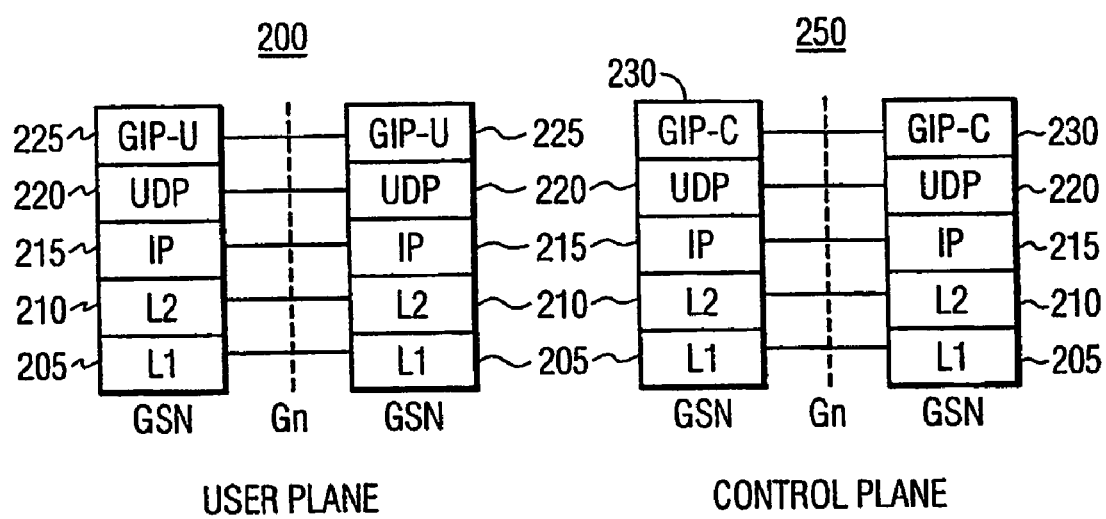
FIG. 2 is a diagram illustrating the user plane 200 and the control plane 250 of the Gn interface, according to an illustrative embodiment of the present invention.

As illustrated in FIG. 1, signaling goes over the UMTS with the GTP-C tunnel 198 established between the SGSN 135 and the GGSN 140 (control plane Gn), while the data path goes via the WLAN over the GTP-U tunnel 199 established between the IWF 105 and GGSN 140 (user plane Gn). FIG. 2 is a diagram illustrating the user plane 200 and the control plane 250 of the Gn interface, according to an illustrative embodiment of the present invention.

The user plane 200 and control plane 250 include, for each GSN, a Level 1 (L1) 205, a Level 2 (L2) 210, an IP layer 215, and a UDP layer 220. The user plane further includes, for each GSN, a GTP-U layer 225. The control plane 250 further includes, for each GSN, a GTP-C level 230.

The control plane 250 in this case relates to GPRS Mobility Management functions like GPRS Attach, GPRS Routing Area Update and Activation of PDP contexts. The GTP-C shall perform the control plane signaling between GSN nodes (e.g., SGSN 135 and GGSN 140). The GTP-C control plane flow shall be logically associated with, but separate from, the GTP-U tunnels. For each GSN-GSN pair, one or more paths exist. One or more tunnels may use each path. GTP-C shall be the means by which tunnels are established, used, managed and released. A path may be maintained by keep-alive echo messages. This ensures that a connectivity failure between GSNs can be detected in a timely manner. GTP-U Tunnels are used to carry encapsulated Tunneled Protocol Data Units (T-PDUs) and signaling messages between a given pair of GTP-U Tunnel Endpoints. The TEID, which is present in the GTP header, shall indicate which tunnel belongs to a particular T-PDU. In this manner, packets are multiplexed and de-multiplexed by GTP-U between a given pair of Tunnel Endpoints.

Figure 3:
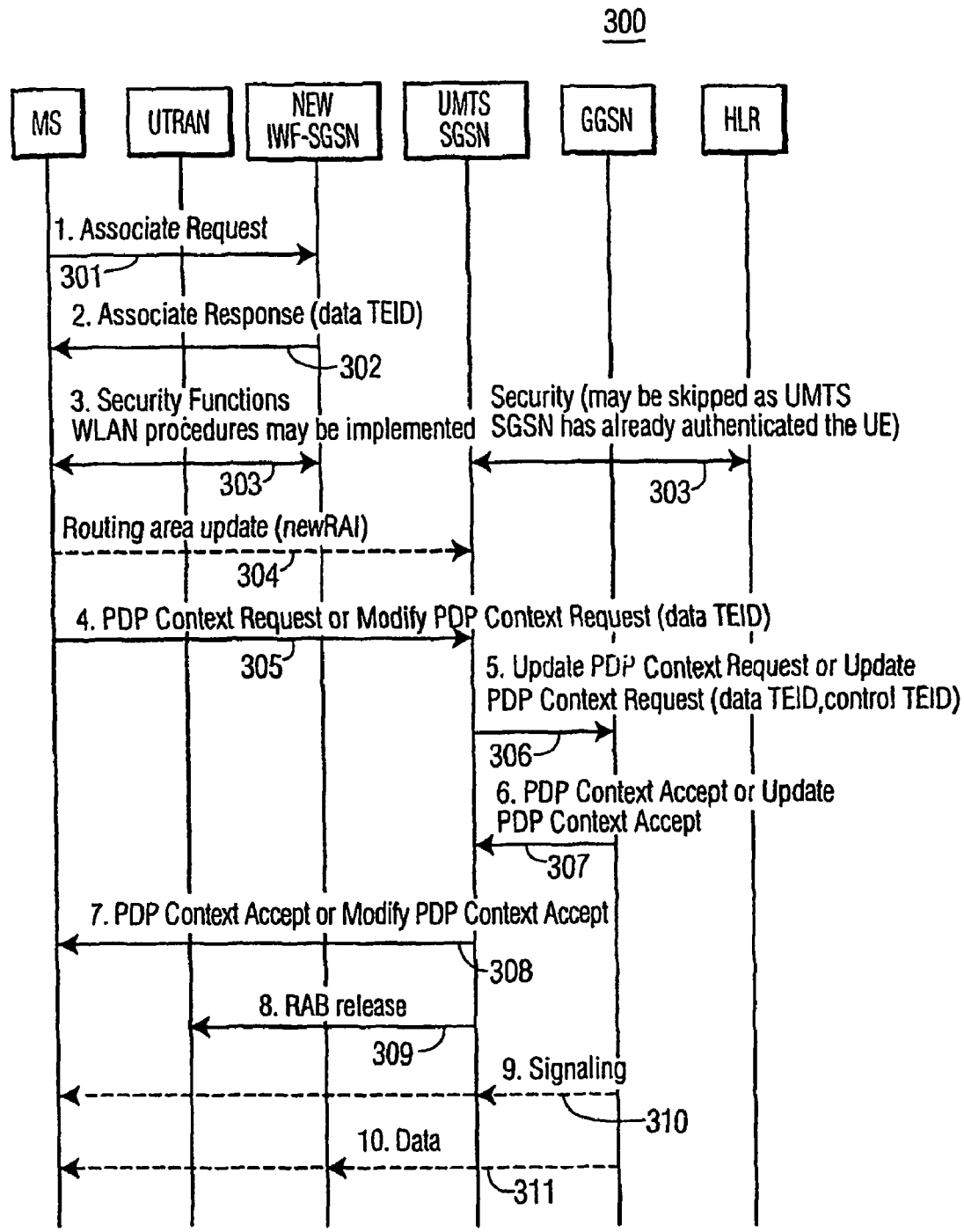
FIG. 3 is a diagram illustrating messages used to enable a data path through a WLAN and a signaling path through a Universal Mobile Telecommunications System (UMTS), according to an illustrative embodiment of the present invention.

FIG. 3 is a diagram illustrating messages used to enable a data path through a WLAN and a signaling path through a Universal Mobile Telecommunications System (UMTS), according to an illustrative embodiment of the present invention. In particular, FIG. 3 illustrates a sequence of messages exchanged between a mobile terminal (also referred to herein as "User Equipment") and an InterWorking Function (IWF) and between the IWF and a Core Network (CN).

When the UE 120 moves into the WLAN coverage area, the UE 120 first needs to "associate" with the WLAN Access Point; accordingly, an "Associate Request" is sent from the UE 120 to the IWF 105 (i.e., the logical SGSN) (step 301). Upon receiving the "Associate Request", an "Associate Response" is sent from the IWF 105 to the UE 120 (step 302).

With respect to network security, in one illustrative embodiment of the present invention, the UE 120 is authenticated via the UMTS network (SGSN-Home Location Register (HLR)) using a User Services Identity Module (USIM), which can then communicate the authentication accept/reject to the WLAN IWF 105 through the GGSN 140 (step 303). The encryption key used in UMTS could be reused when the UE 120 is connected with a WLAN.

With respect to UE mobility, two illustrative approaches are described herein. However, it is to be appreciated that the present invention is not limited to the following two approaches to UE mobility and, thus, other approaches to UE mobility may be employed while maintaining the spirit and scope of the present invention.

With respect to the first approach concerning UE mobility, the WLAN coverage area can be registered as a different Routing Area (RA). In such a case, the UE 120 informs the new Routing Area Identifier (RAI) in the WLAN (step 304) such that the SGSN 135 recognizes the new RAI as corresponding to the WLAN and the SGSN 135 does not start inter-SGSN procedures (e.g., as per the $3^{rd}$ Generation Partnership Project (3GPP) standards). Instead, the SGSN 135 is configured such that if a PDP Context Request or a Modify PDP Context Request (as shown in step 305) comes from the UE 120, then the SGSN 135 is to specify the IWF address and TEIDs for the GTP-U establishment. If a pre-existing PDP Context is modified upon entering the WLAN or if the primary PDP Context is established only upon entering the WLAN, then the Security Management (SM) and GPRS Mobility Management (GMM) in the UMTS SGSN 135 shall keep track of the UE SM and GMM state machines.

With respect to the second approach concerning UE mobility, the WLAN IWF 105 implements mobile IP within the WLAN with the GGSN 140 as the Foreign Agent (FA) to handle UE mobility. The advantage of not doing the second tunneling between the RNC 130 and SGSN 135 should compensate for the complexity of using mobile IP with the GGSN 140 being the foreign agent. A mechanism to inform the SGSN 135 to establish the GTP-U between the GGSN 140 and the IWF 105 can be the 3G Location Services (LCS), which informs the SGSN 135 if the UE 120 is near an IWF 105.

When the UE 120 moves into the WLAN coverage area, if the UE 120 has already established a PDP context session with the UMTS SGSN 135, then the UE 120 can send a "Modify PDP Context Request" (step 305) to the UMTS SGSN 135 to establish the data plane over the WLAN and to retain the control plane over the UMTS. The SGSN 135 may restrict the desired QoS profile given its capabilities, the current load, and the subscribed QoS profile. An "Update PDP Context Request" message is sent from a SGSN 135 to a GGSN 140 as part of the PDP Context Modification procedure or to redistribute contexts due to load sharing (step 306). The Update PDP Context Request message shall be used to change the QoS and the path. A valid Update PDP Context Request initiates the creation of a tunnel between SGSN 135 and GGSN 140 on the control plane and between IWF 105 and GGSN 140 on the user plane. An "Update PDP Context Response" is sent from the GGSN 140 to SGSN 135 (step 307). If the negotiated QoS received from the SGSN 135 is incompatible with the PDP context being activated, then the GGSN 140 rejects the Update PDP Context Request message; otherwise, the GGSN 140 accepts the Update PDP Context Request message. SGSN 135 will then send the Modify PDP Context Accept/Reject to UE 120 (step 308).

If there is no PDP context as yet between the UE 120 and the SGSN 135, the UE 120 can send an "Activate PDP Context Request" to the UMTS SGSN 135 as shown at step 305. Subsequently, a Create PDP Context Request shall be sent from the SGSN 135 to the GGSN 140 as a part of the GPRS PDP Context Activation procedure as shown at step 306. A valid Create PDP Context Request initiates the creation of a tunnel between SGSN 135 and GGSN 140 on the control plane and between IWF 105 and GGSN 140 on the user plane. A "Create PDP Context Response" is sent from GGSN 140 to SGSN 135 (step 307). If the negotiated QoS received from the SGSN 135 is incompatible with the PDP context being activated, then the GGSN 140 rejects the Create PDP Context Request message; otherwise, the GGSN 140 accepts the Create PDP Context Request message. SGSN 135 will then send the Activate PDP Context Accept/Reject to UE 120 (step 308). If there had been an existing session when UE 120 had moved from UMTS to WLAN coverage, the data bearer for that session can now be explicitly torn down (step 309) to save UMTS bandwidth. Subsequent signaling will use the UE-UTRAN-SGSN-GGSN path (step 310) and data will use the UE-IWF-GGSN path (step 311).

A Tunnel Endpoint Identifier (TEID) Data I field specifies a downlink TEID for G-PDUs, which is chosen by the SGSN 135. The GGSN 140 includes this TEID in the GTP header of all subsequent downlink G-PDUs that are related to the requested PDP context. To establish the GTP-U over the WLAN interface, this TEID shall be chosen such that the tunnel is between the GGSN 140 and the IWF 105. This TEID can be sent from the IWF 105 to the UE 120 at the time of "associate response" at step 302, and from the UE 120 to the SGSN 135 at the time of "PDP request" at step 305. The SGSN 135 forwards the TEID to the GGSN 140 as a part of the PDP context request message at step 306.

The TEID Control Plane field specifies a downlink TEID for control plane messages, which is chosen by the SGSN 135. The GGSN 140 includes this TEID in the GTP header of all subsequent downlink control plane messages, which are related to the requested PDP context. If the SGSN 135 has already confirmed successful assignment of its TEID Control Plane to the peer GGSN, this field is not present. The SGSN 135 confirms successful assignment of its TEID Control Plane to the GGSN 140 when the SGSN 135 receives any message with its assigned TEID Control Plane in the GTP header from the GGSN 140.

Also, the SGSN 135 includes an SGSN "Address for control plane" (UMTS SGSN) and an SGSN "address for user traffic" (IWF) with the PDP Context Request or Update PDP Context Request, which may differ from that provided by the underlying network service (e.g. IP) at step 306. The GGSN 140 shall store these SGSN Addresses and use them when sending subsequent control plane messages on this GTP tunnel as in steps 307 and 310 or G-PDUs to the IWF for the MS as in step 311.

A description will now be given of some of the many advantages of the present invention. One such advantage is that most of the procedures of the 3G network (e.g., UMTS) are re-used. In the first UE mobility approach above, mobility procedures also may be re-used. Re-use of the 3G network procedures aids in keeping the WLAN gateway simple, as it shall only need to carry the user plane while the complex control plane reuses the UMTS system. For PS services, the data plane takes the majority of the radio resources. So by diverting the data part to the WLAN in hotspots, considerable expensive UMTS radio resources shall be saved which can be now used for other users and other services while the UE retains the connection with the CN. Another advantage is that the WLAN coverage area may be hauled back to different operators since the signaling portion can remain with the 3G operator and the data plane can go through the WLAN. Instead of deploying his own WLANs in hotspots, the 3G operator can use existing WLAN deployment. Yet another advantage is that expensive radio resources in the 3G network can be released while the UE is in the WLAN coverage area. Still another advantage is that the handling of the SM/GMM state machines in the UMTS SGSN aids in keeping the IWF functionality limited to the data tunneling. Moreover, since the IP-based Gn user plane interface is relatively simple to implement, the solution is scalable. Also, the 3G operator provides one point of attachment (GGSN) to give access to both the 3G and the WLAN networks. Since a large part of the UMTS bandwidth would be used by data users, diversion of data traffic away from the UMTS network to WLAN will effectively increase the capacity of the UMTS network. Also since in UMTS data is tunneled first from UTRAN to SGSN and then again from SGSN to GGSN, in the proposed system there shall be one less encapsulation as only the SGSN (IWF)-GGSN encapsulation part will be done in the WLAN.

Although the illustrative embodiments have been described herein with reference to the accompanying drawings, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for supporting an interworking between a Wireless Local Area Network (WLAN) and a mobile communications system, the mobile communications system comprising a UMTS network having a Serving General Packet Radio Service (GPRS) Support Node (SGSN) as a first Support Node for interfacing a radio access network comprising a Radio Network Controller (RNC) to a core network and a Gateway GPRS Support Node (GGSN) as a second Support Node for interfacing the mobile communications system to a second communications system, the method comprising the steps of:

providing an interworking function (IWF) associated with the WLAN and coupled to the mobile communications system, the IWF is disposed on a WLAN side of the interworking;

establishing at least one GPRS Tunneling Protocol—User plane GTP-U tunnel between the IWF and the second Support Node for transferring data signals, wherein establishing the at least one GPRS Tunneling Protocol—User plane GTP-U tunnel couples the IWF of the WLAN to the GGSN of the mobile communications network while bypassing the RNC and the SGSN of the mobile communications network; and establishing at least one GPRS Tunneling Protocol—Control plane GTP-C tunnel between the first Support Node and the second Support Node for transferring control signals.

2. The method of claim 1, wherein the IWF is configured as a logical SGSN with respect to the data signals.

3. The method of claim 1, wherein said step of establishing the at least one GTP-U tunnel comprises the step of defining a GTP tunnel in a GTP-U for at least one Packet Data Protocol (PDP) context in at least one of the GGSN and the IWF.

4. The method of claim 1, wherein said step of establishing the at least one GTP-C tunnel comprises the step of defining a GTP tunnel in a GTP-C for at least one Radio Access Bearer (RAB).

5. The method of claim 1, wherein said step of establishing the at least one GTP-C tunnel comprises the step of defining a GTP tunnel in a GTP-C for at least one Packet Data Protocol (PDP) context with a same PDP address and Access Point Name (APN) for tunnel management messages.

6. The method of claim 1, wherein a GTP-C carries GPRS mobility management functions.

7. The method of claim 1, further comprising the step of providing access to both the WLAN and the mobile communications system through a single point of attachment consisting of the GGSN.

8. The method of claim 1, wherein the Core Network includes, the GGSN and the SGSN, and the method further includes the step of maintaining a connection between a User Equipment (UE) and the CN while diverting data to the UE through the at least one GTP-U tunnel between the GGSN and the IWF.

9. The method of claim 1, further comprising the steps of:
authenticating a User Equipment (UE) by the mobile communications network;
communicating a result of said authenticating step to the IWF through the GGSN.

10. The method of claim 1, further comprising the steps of:
registering a WLAN coverage area as a different Routing Area (RA) with the mobile communications network; and
specifying an IWF address and Tunnel Endpoint Identifiers (TEIDs) for said step of establishing the at least one GTP-U tunnel, when one of a Packet Data Protocol (PDP) request of a modify PDP request is received from a User Equipment (UE).

11. The method of claim 1, further comprising the steps of:
employing the GGSN as a Foreign Agent (FA) to handle UE mobility; and
informing the SGSN to establish the at least one GTP-U tunnel.

12. The method of claim 1, further comprising the step of employing encryption used by the mobile communications network for a user connecting to the WLAN.

\* \* \* \* \*